United States Patent [19]
Okano

[11] Patent Number: 5,199,007
[45] Date of Patent: Mar. 30, 1993

[54] COMPACT WATCH DOG TIMER CIRCUIT

[75] Inventor: Masami Okano, Saitama, Japan

[73] Assignee: Zexel Corporation, Tokyo, Japan

[21] Appl. No.: 648,910

[22] Filed: Feb. 1, 1991

[30] Foreign Application Priority Data

Feb. 8, 1990 [JP] Japan .................. 2-28905

[51] Int. Cl.<sup>5</sup> .................. G04F 8/00; G06F 11/30
[52] U.S. Cl. .................. 368/108; 371/62
[58] Field of Search .................. 368/107, 113, 118; 364/569, 900; 371/16.3, 60-63

[56] References Cited

U.S. PATENT DOCUMENTS

| | | | |
|---|---|---|---|
| 4,538,273 | 8/1985 | Lasser | 371/62 |
| 4,586,179 | 4/1986 | Sirazi | 371/12 |
| 4,763,296 | 8/1988 | Gercekci | 364/900 |
| 4,796,211 | 1/1989 | Yokouchi | 364/569 |
| 4,809,280 | 2/1989 | Shonaka | 371/62 |
| 5,081,625 | 1/1992 | Rhee et al. | 371/16.3 |

Primary Examiner—Vit W. Miska
Attorney, Agent, or Firm—Kanesaka & Takeuchi

[57] ABSTRACT

A compact watch dog timer circuit which includes a pulse period determining circuit (1) for generating a timer reset pulse if a period of an input pulse from an external machine falls within a tolerance range or beyond an upper limit of the tolerance range and no timer reset pulse if the period falls below a lower limit of the tolerance range; and a timer (2) for generating a signal for restoring the external machine to a predetermined condition when no timer reset pulse is fed from the pulse period determining circuit within a timer period which is set corresponding to the tolerance range.

4 Claims, 3 Drawing Sheets

COMPACT WATCH DOG TIMER CIRCUIT

BACKGROUND OF THE INVENTION

1. Field of the Invention

The present invention relates to watch dog timer circuit for generating a reset pulse for restoring a central processing unit, such as a microcomputer, (hereinafter "CPU") from a runaway condition.

2. Description of the Prior Art

If a CPU for controlling a machine or the essential part thereof becomes out of control for some reason, the controlled machine can be runaway causing a severe personal injury or mechanical damage. For this reason, such a microcomputer controlled machine is designed to generate a pulse for each time that the CPU has processed a predetermined number of steps for monitoring the operation. If the period of the pulse is below a tolerance limit, it is determined that the CPU operates normally. If the pulse period falls beyond the tolerance limit, on the other hand, it is determined that the CPU is out of control, and a watch dog timer circuit generates a reset pulse for restoring the CPU to the normal condition (usually the initial condition). The watch dog timer circuit includes a timer which times up when the pulse from the CPU does not fall below the tolerance limit and outputs a reset pulse of a predetermined pulse width.

The conventional watch dog timer circuit, however, detects whether the pulse from the CPU extends beyond the upper limit of a tolerance range so that it is impossible to detect any runaway condition which falls below the lower limit of the tolerance range. Thus, it has been proposed to provide a second timer for detecting a runaway condition below the lower limit of the tolerance range so that if the pulse falls outside the tolerance range, a reset pulse is generated to restore the microcomputer to the normal condition. However, such a structure requires two timer sets.

SUMMARY OF THE INVENTION

Accordingly, it is an object of the invention to provide a compact watch dog timer circuit which is able to detect a runaway condition of a CPU which falls outside a tolerance range and restoring the normal condition.

According to the invention there is provided a compact watch dog timer circuit which includes a pulse period determining circuit for generating a timer reset pulse if a period of an input pulse from an external machine falls within a tolerance range or beyond an upper limit of the tolerance range and no timer reset pulse if the period falls below a lower limit of the tolerance range; and a timer for generating a signal for restoring the external machine to a predetermined condition when no timer reset pulse is fed from the pulse period determining circuit within a timer period which is set corresponding to the tolerance range.

According to the invention, as far as the input pulse from an external machine, such as a CPU, falls outside the tolerance range, no timer reset pulse is outputted by the pulse period determining circuit within the timer period so that the timer times up and outputs a reset signal or pulse to restore the external machine to the predetermined condition. Thus, it is not necessary to use two timers, making the circuit simpler.

The above and other objects, features, and advantages of the invention will become more apparent from the following description when taken in conjunction with the accompanying drawings.

DESCRIPTION OF THE PREFERRED EMBODIMENT

Figure 1:
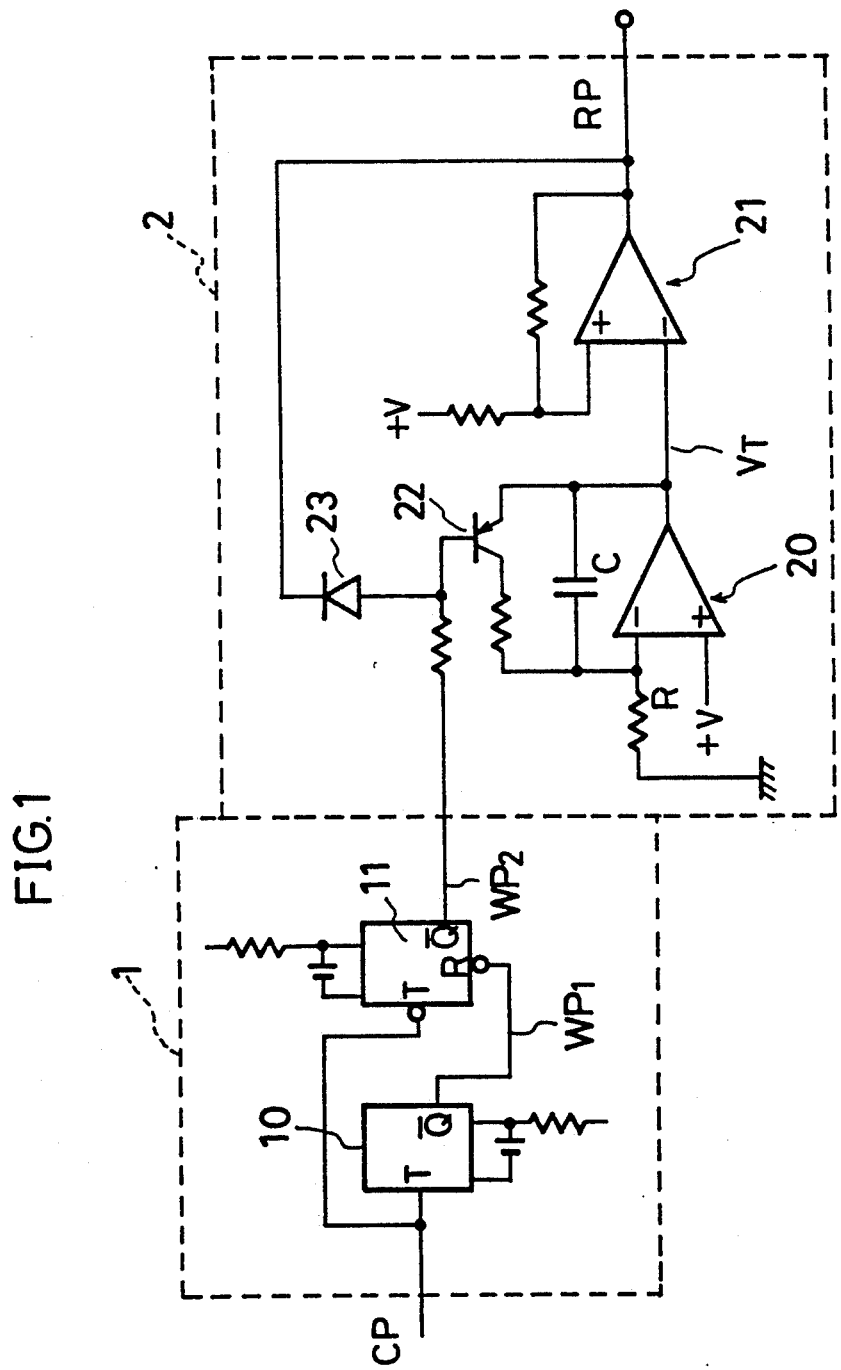
FIG. 1 is a schematic diagram of a compact watch dog timer circuit according to an embodiment of the invention.

In FIG. 1, the compact watch dog timer circuit includes a pulse period determining circuit 1 and a timer 2.

The pulse period determining circuit 1 receives an input pulse CP from a central processing unit, such as a CPU, for monitoring the operation. A pair of one-shot circuits 10 and 11 determine whether the period of the input pulse CP is below the lower limit of a tolerance range. When the CPU is normal, the determining circuit 1 receives the input pulse CP which repeats itself with a period T as shown at (A) in FIG. 2. The first one-shot circuit 10 generates at the leading edge of each input pulse CP a one-shot pulse WP1 having a pulse width t1 which is slightly smaller than the pulse width T/2 of the input pulse as shown at (B) in FIG. 2. The second one-shot circuit 11 generates a one-shot pulse WP2 with a small pulse with t2 at the tailing edge of each input pulse CP at the "H" level of the one-shot pulse WP1 for resetting the timer.

In such a structure, when the input pulse CP has the normal period T, there is a tailing edge of the input pulse CP after the one-shot pulse WP1 returns to the "H" level so that the other one-shot circuit 11 is always triggered to putout a one=shot pulse WP2 with the pulse width t2. The one-shot pulse WP2 is fed to the timer 2 as a timer reset pulse. The timer 2 includes a power supply of a predetermined voltage (+V); an integrating circuit 20 provided with a resistor R and a capacitor C for determining a time constant; a comparator for determining whether the output voltage $V_T$ exceeds a threshold Th and, if it exceeds the threshold, generates a "L" level reset pulse RP for the CPU; a transistor 22 for shunting around the capacitor C to reset the integrating voltage; and a diode for feeding the reset pulse RP back to the base of the transistor 22. The one-shot pulse WP2 from the second one-shot circuit 11 is fed to the base of the transistor 22 as a timer rest pulse.

Figure 2:
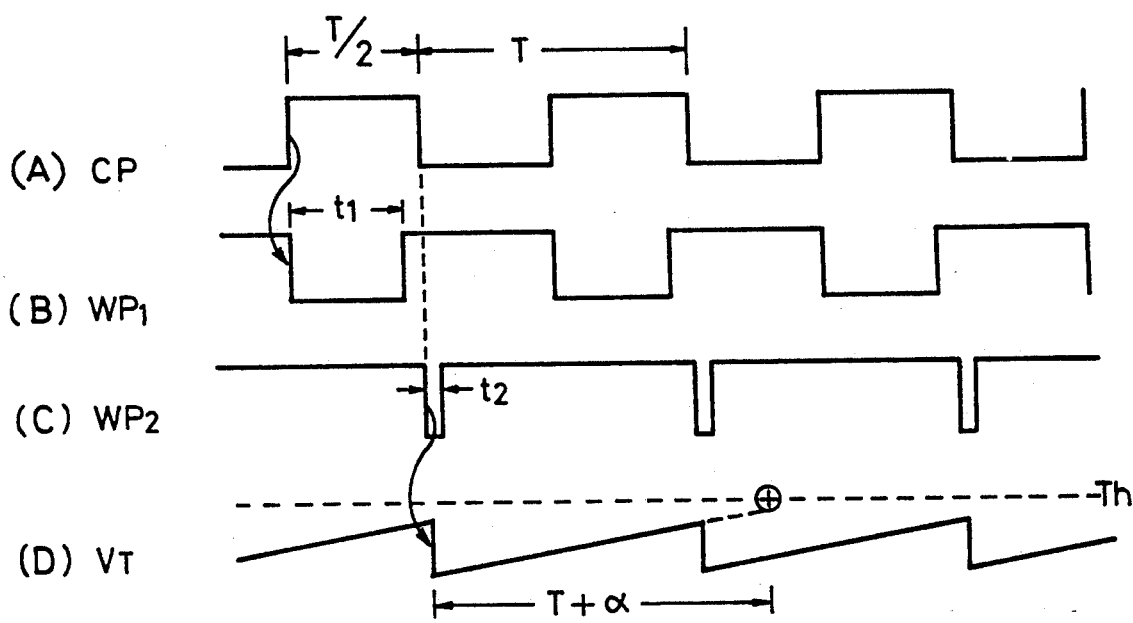
FIG. 2 is a timing chart showing signals at respective points when the period of an input pulse is normal.

In the timer 2, the timer period defined by the time constant CR of the integrating circuit 20 is set at "T $+\alpha$" as shown at (D) in FIG. 2. When no one-shot pulse WP2 is fed for the period "T$+\alpha$" after charging the capacitor C is started, the output voltage $V_T$ of the integrating circuit 20 reaches the threshold Th. When the input pulse CP is fed in the normal period, the one-shot pulse WP2 is fed to the base of the transistor 22 within the period "T$+\alpha$" to reset the voltage for charging the capacitor C as shown at (C) of FIG. 2. Consequently, the output voltage $V_T$ of the integrating circuit 20 never reaches the threshold Th as shown at (D) of FIG. 2. Unless the output voltage $V_T$ reaches the threshold Th, the output of the comparator 21 is not inverted, and no reset pulse RP is outputted.

Figure 3:
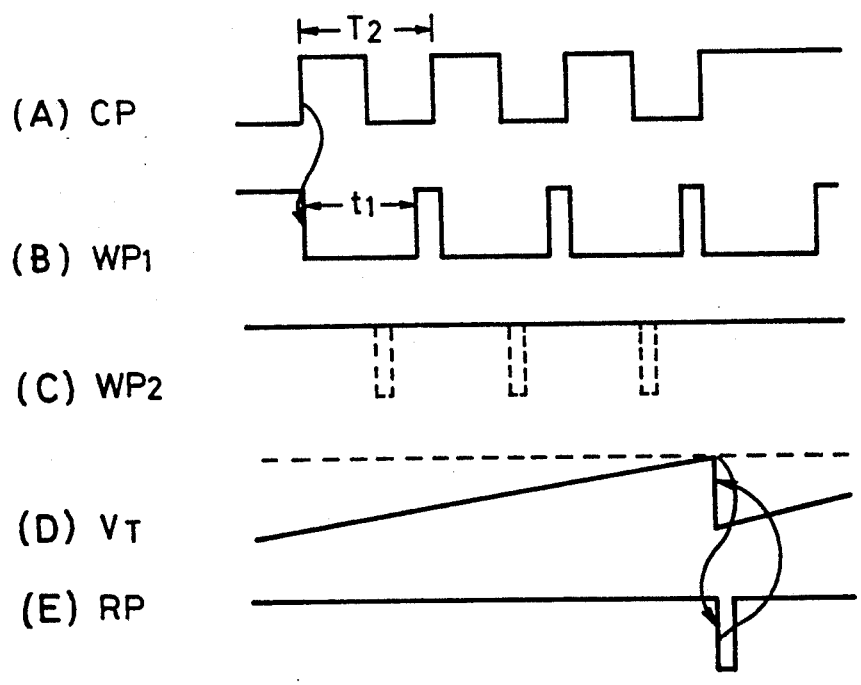
FIG. 3 is a timing chart showing signals at respective points when the period of an input pulse is too short.

As shown at (A) of FIG. 3, when the period of the input pulse CP is T2 which is shorter than the normal period T, the input pulse CP falls before the one-shot pulse WP1 returns to the "H" level so that the one-shot circuit 11 is not triggered. Consequently, no one-shot pulses WP2 are generated as shown by broken lines at (C) of FIG. 3, and the charging voltage for the capacitor C is not reset. When the period that the charging voltage is not reset reaches the period "T +α", the output voltage of the integrating circuit 20 reaches the threshold Th. Consequently, the output of the comparator 21 is inverted to output a reset pulse RP as shown at (E) of FIG. 3. The reset pulse RP is fed to the CPU and the base of the transistor 22 via the diode 23. This turns on the transistor 22, resetting the charging voltage for the capacitor C and initializing the output voltage $V_T$ of the integrating circuit 20.

Figure 4:
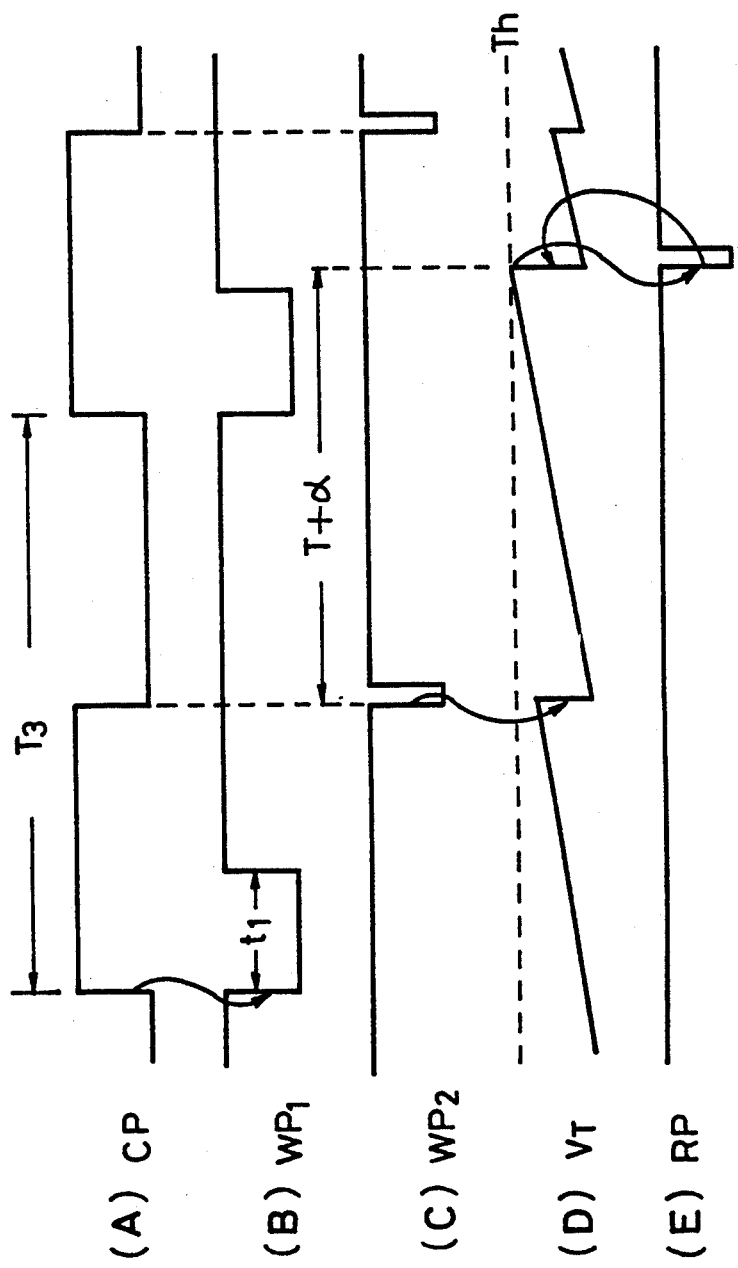
FIG. 4 is a timing chart showing signals at respective points when the period of an input pulse is too long.

As shown at (A) of FIG. 4, when the period of the input pulse CP is T3 which is longer than the normal period T ($>$T+α), one-shot pulse WP2 is generated as shown at (C) of FIG. 4. The period that the next one-shot pulse WP2 is generated becomes longer than the period "T+α" so that the output voltage $V_T$ of the integrating circuit 20 reaches the threshold Th, when a reset pulse RP is generated as shown at (E) of FIG. 4. This reset pulse RP initializes the output voltage $V_T$ of the integrating circuit 20.

As has been described above, in this embodiment, when the pulse period determining circuit 1 determines that the period of an input pulse CP falls outside the tolerance range, the integrating circuit 20 is not reset but a reset pulse RP for the CPU is generated after the timer period set in the integrating circuit 20 so that it is possible with a simple structure to detect and restore a runaway condition of the CPU. Thus, there is only one timer necessary with a pulse period determining circuit added to the timer.

Alternatively, the timer capacitor may be replaced by a digital timing piece. The reset pulse used to restore the machine to the predetermined condition in the above embodiment may be used as an interrupt signal.

What is claimed is:

1. A compact watch dog timer circuit comprising:
    a pulse period determining circuit for generating a timer reset pulse if a period of an input pulse from an external machine falls within a tolerance range or beyond an upper limit of said tolerance range and no timer reset pulse if said period falls below a lower limit of said tolerance range; and
    a timer for generating a signal for restoring said external machine to a predetermined condition when no timer reset pulse is fed from said pulse period determining circuit within a timer period which is set corresponding to said tolerance range.

2. The compact watch dog timer circuit of claim 1, wherein said external machine is a microcomputer or the like.

3. The compact watch dog timer circuit of claim 1, wherein said pulse period determining circuit comprises:
    a first one-shot circuit for generating a first one-shot pulse at a "L" level with a pulse width slightly smaller than a half of a standard period of said input pulse at a leading edge of said input pulse from said external machine; and
    a second one-shot circuit for generating a narrow second one-shot pulse as a timer reset pulse at a tailing edge of said input pulse at a "H" level of said first one-shot pulse.

4. The compact watch dog timer circuit of claim 1, wherein said timer comprises:
    an integrating circuit provided with a resistor and a capacitor for defining a time constant;
    a comparator for determining whether an output of said integrating circuit exceeds a threshold and generating, if it exceeds said threshold, a rest pulse for restoring said external machine to a predetermined condition;
    a transistor turned on with said timer reset pulse for shunting around said capacitor to reset an integrating voltage; and
    a diode for feeding said reset pulse back to said transistor.

* * * * *